Dec. 23, 1952 S. S. ROTH 2,623,190

COLOR TELEVISION SYSTEM

Filed Feb. 13, 1950 3 Sheets-Sheet 1

INVENTOR.
SOLO S. ROTH

BY Ralph E. Bitner

ATTORNEY

Dec. 23, 1952

S. S. ROTH 2,623,190

COLOR TELEVISION SYSTEM

Filed Feb. 13, 1950

3 Sheets-Sheet 2

*INVENTOR.*
SOLO S. ROTH

*BY* Ralph E. Bitner

ATTORNEY

INVENTOR.
SOLO S. ROTH
BY Ralph W. Bitner
ATTORNEY

Patented Dec. 23, 1952

2,623,190

UNITED STATES PATENT OFFICE 2,623,190

COLOR TELEVISION SYSTEM

Solo S. Roth, Yonkers, N. Y.

Application February 13, 1950, Serial No. 143,885

5 Claims. (Cl. 313—77)

This invention relates to a color television picture tube, and has particular reference to a sequential color system in which all the received color pictures are received in a single cathode ray tube.

A large number of color television pictures have been proposed and a few have been demonstrated. One system uses three tubes for receiving the three color pictures and has the disadvantage of an expensive installation and major difficulties in bringing all three pictures together. Another color television system uses a rotating color wheel in front of a single fluorescent screen and suffers the inconvenience of mechanically moving parts with the attendant possibility of motor noise.

The system herein described uses no moving parts and has a single tube where all three color pictures are received. The registration problem is greatly simplified and since only one tube is used the cost is not excessive.

One of the objects of the invention is to provide an improved television tube which avoids one or more of the disadvantages and limitations of prior art arrangements.

Another object of the invention is to provide a television tube capable of showing a colored picture with no mechanical motion.

Another object of the invention is to reduce the cost of color television receivers by positioning all three color pictures adjacent each other in a single cathode ray tube.

Another object of the invention is to insure registration stability by using the same electron gun for each color picture and by using fluorescent screens whose angles and positions are permanently fixed in relation to each other.

One feature of the invention includes a color television receiving tube which reproduces three color-separation pictures. The invention uses a cathode ray tube which comprises an electron gun for producing a cathode ray beam, three fluorescent screens mounted in an angular array near one end of the tube, and electrostatic deflection means for causing the cathode beam to scan all three screens. The tube contains as an alternate device magnetic deflection means for causing the cathode beam to scan the screens mounted in an angular manner.

For a better understanding of the present invention, together with other and further objects thereof, reference is made to the following description taken in connection with the accompanying drawings.

Figure 1:
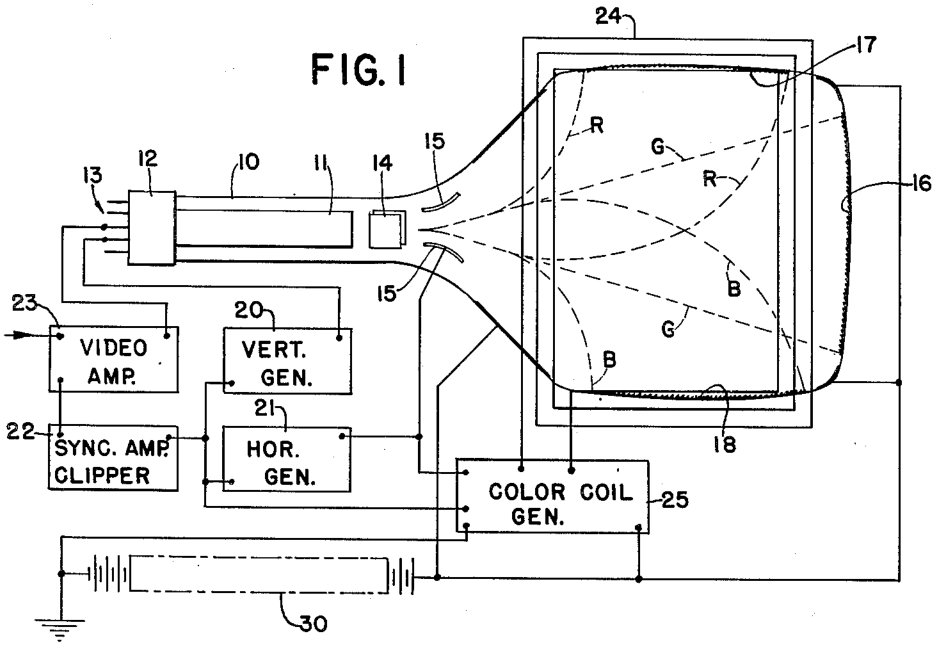
Fig. 1 is a schematic view of a color television receiving tube with three fluorescent screens. Some of the circuit components are shown in block representation.

Referring now to Fig. 1, the color television tube comprises an elongated neck 10 in which an electron gun 11 is mounted. An insulated base 12 contains conducting pins 13 which make contact with connectors in a socket. One pair of deflection plates 14 deflects the cathode ray beam in a direction perpendicular to the plane of the paper while a second set of plates 15 deflect the beam at right angles to this direction.

In the large end of the tube three fluorescent screens are positioned. One screen 16 is directly opposite the electron gun and is in the position usually occupied by the screen in a monochrome tube. A second screen 17 is mounted on the side of the tube at an angle of about ninety degrees from the first. A third screen 18 is mounted opposite to the second screen and is also about ninety degrees from the first screen.

It will be obvious that the picture on screen 16 may be formed in the usual manner by the proper scanning voltages applied to the two pairs of deflection plates 14 and 15. To this end a vertical scanning generator 20 is shown in block representation to provide a saw-tooth wave for plates 14 and a horizontal scanning generator 21 is shown to provide a similar wave for plates 15. These generators are controlled by an amplifier and clipper 22. The usual video amplifier 23 applies a voltage to a control grid in the electron gun to alter the intensity of the cathode beam in proportion to picture values. A high voltage power supply is indicated at 30 which may be any of the usual power supply circuits. The high voltage is used by the color coil generator and also by the accelerating electrodes inside the tube.

To produce pictures on fluorescent screens 17 or 18 an additional set of deflection components is necessary. A coil 24 above the tube and a similar coil below the tube produce a magnetic field which turns the cathode beam through a circular path as shown in the figure by lines B—B. Current for these coils is furnished by a color coil generator 25 which is conveniently controlled by the voltages generated by the vertical scanning generator 20. When the current in coil 24 is in one direction the cathode beam is moved out of its usual path in one direction and when the current is reversed the direction is reversed. In this manner a red picture may be projected on screen 18 and a blue picture on screen 17.

Figure 2:
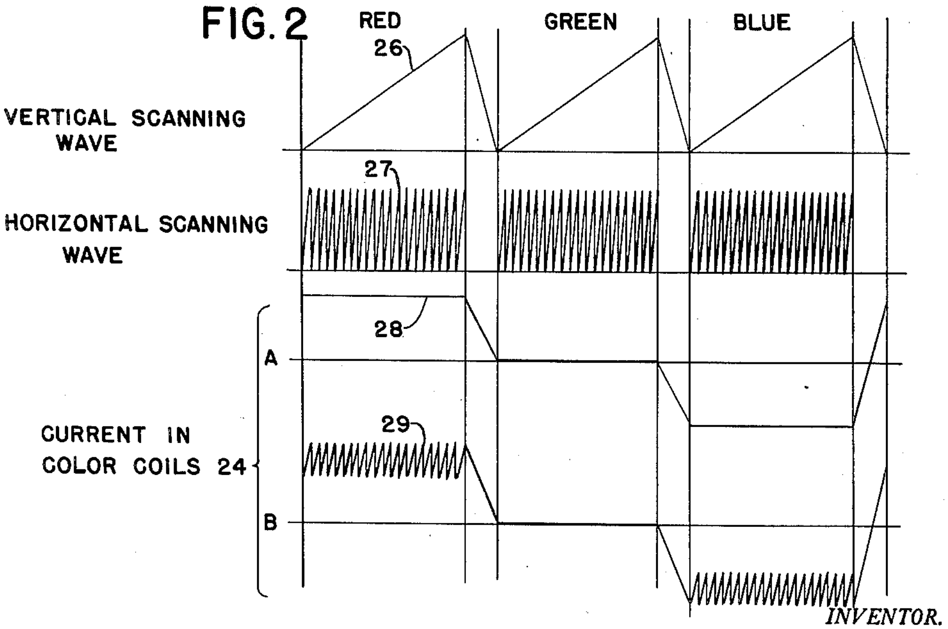
Fig. 2 is a graph of the voltages and currents necessary to produce the required results in the tube of Fig. 1.

The series of graphs in Fig. 2 indicate the type of wave forms needed. Curve 26 shows the usual vertical scanning wave which is the same for all three colors. Curve 27 shows the usual non-interlaced horizontal scanning wave which also is the same for all three colors. Curve 28 shows a positive steady current during the red picture, no current during the green picture and a negative steady current during the blue picture. An alternate wave form for coils 24 comprises the addition of current variations 28 and a portion of the horizontal scanning wave 27. The resultant wave is shown at 29. This wave produces a greater deflection of the side image and if the amount of horizontal scanning voltage is variable the horizontal size of the red and blue images may be varied to match the size of the green image.

Figure 3:
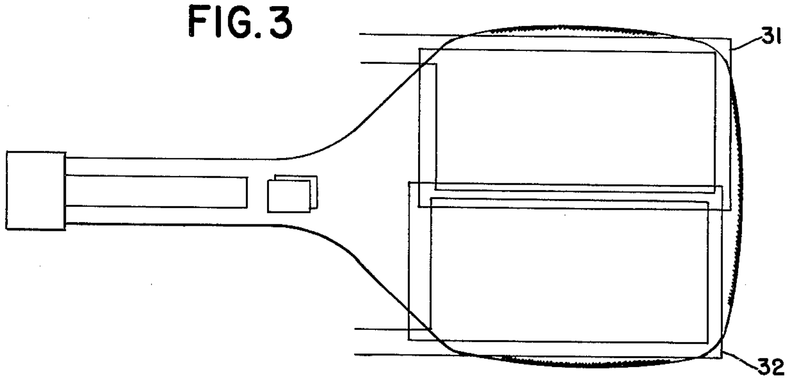
Fig. 3 is a schematic view of a color television receiving tube with two magnetic deflection coils.

The tube shown in Fig. 3 is similar to that of Fig. 1 except that it contains two sets of coils 31 and 32 instead of a single coil. The double set of coils permits individual adjustments on the red and blue pictures and also cuts the power supply substantially in half. The current in coil 31 is on only when the blue picture is being projected and the current in coil 32 is on only when the red picture is being projected. It is assumed that the half coils 31 and 32 consume about one half the electrical energy of the full coil 24.

Figure 4:
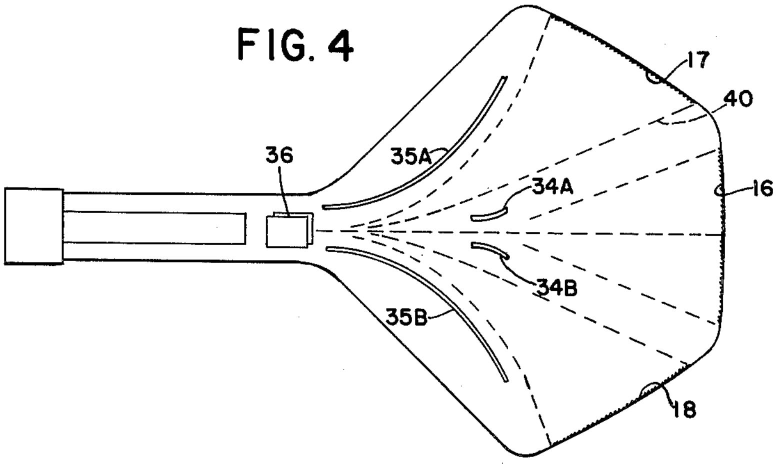
Fig. 4 is a schematic view of an alternate type of tube design in which two of the screens are inclined from the third screen by angles of about sixty degrees.

The tube shown in Fig. 4 has three fluorescent screens 16, 17, and 18; the side screens making an angle of about sixty degrees with the end screen instead of ninety degrees. Deflection of the cathode ray beam is accomplished by means of two sets of electrostatic plates. One set 34 functions in the usual manner to produce a raster on the end screen 16. These plates are set closer to the screen than usual and, therefore, must have considerable width in order to control the beams that have been deflected by vertical deflection plates 36.

A second set of plates 35 is mounted close to the electron gun with a wide flair. The plates extend almost to the screens 17 and 18 and are formed with a cylindrical surface. They are used only when a picture is to be projected on one of the side screens.

Figure 5:
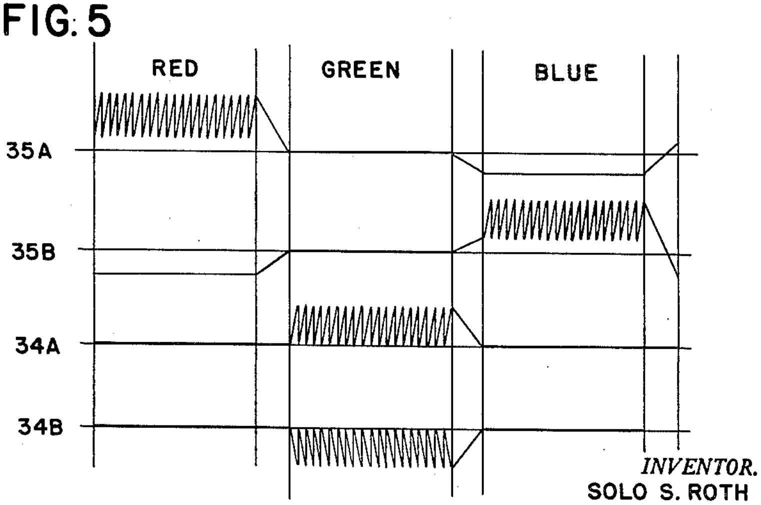
Fig. 5 is a graph of voltages which are used on the tube of Fig. 4 to produce three color-separation pictures.

The graph in Fig. 5 indicates the voltages which must be applied to the deflection plates in order to project three color-separation pictures on screens 16, 17 and 18. During the production of the red picture on screen 17 a small positive average biasing potential is applied to plate 35–A and a similar negative potential is applied to plate 35–B. These biasing potentials are sufficient to deflect the beam along path 40. Then a saw-tooth wave is superimposed on 35–A and the beam scans screen 17, producing a red image. During this time there is no voltage applied to deflection plates 34.

When screen 16 is to be scanned to produce a green picture the usual saw-tooth scanning voltages are applied to deflection plates 34. During this time there are no potentials applied to deflection plates 35.

To produce the blue picture on screen 17 no potentials are applied to deflection plates 34 and potentials similar to those used for the red picture are applied to deflection plates 35 in a reversed polarity.

The above method produces the three images in sequential manner; that is, the entire red image is produced first, then the entire green image, and then the blue. It will be obvious that there are other methods of scanning which can be used by the disclosed tubes, some of which are particularly well adapted for use with these tubes because the three images are all produced by a single cathode ray beam and because the images are positioned in adjacent arrangement.

A second method for scanning the three screens comprises the following procedure: The odd lines of the red image are first scanned, then the odd lines of the green image, and third the odd lines of the blue image. Then the even lines of the red, green, and blue images are scanned in that order to complete a double-sequential interlaced set of images. Still another method includes scanning the first lines of the red, green, and blue images; then the third lines of the same images in the same order; continuing until all the odd lines of all three images have been scanned; and then scanning all the even lines in the same order. It is believed that the above mentioned scheme of scanning produces the least amount of eye strain and still gives the smallest amount of color fringe for transmitted pictures which show fast moving objects.

Other methods of scanning the three images are possible and can easily be devised by engineers skilled in the scanning art.

Figure 6:
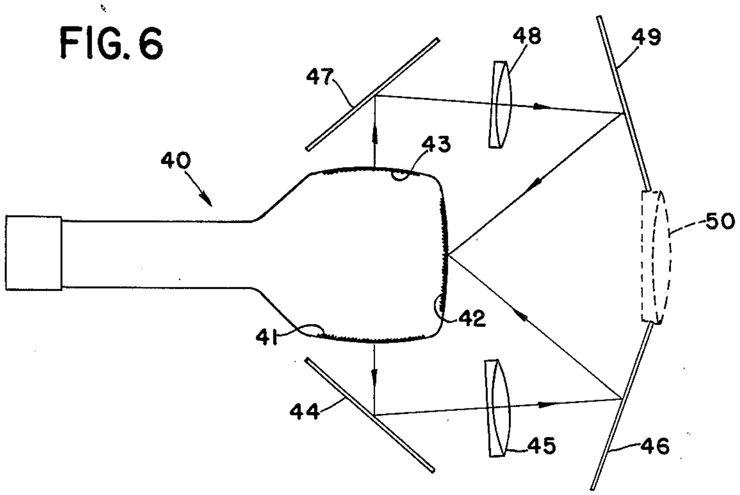
Fig. 6 is a schematic diagram to show the manner in which two of the television color pictures may be focused on a third.
Figure 7:
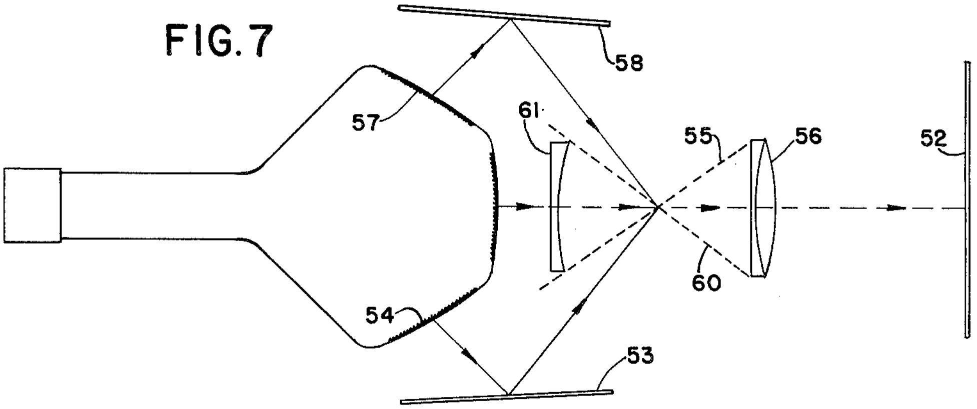
Fig. 7 is a schematic diagram showing how the tube of Fig. 4 may be used with an optical system to focus three color-separation pictures in coincidence on a projection screen.
Figure 8:
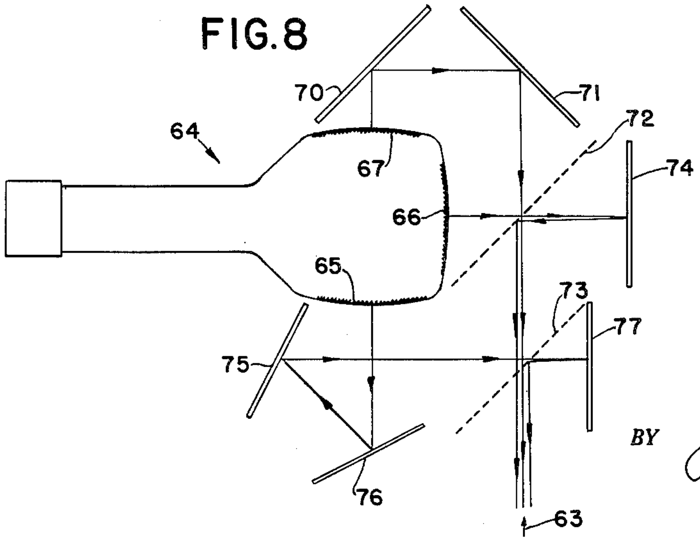
Fig. 8 is a schematic diagram showing how the tube of Fig. 1 or 3 may be used with a collection of mirrors to provide a single virtual image which contains all three color-separation pictures.

Figures 6, 7 and 8 illustrate the manner in which a three-screen tube may be used in practice to project all the pictures to a position where they may be viewed as a composite unified color picture.

Fig. 6 illustrates a method of combining three pictures by using the fluorescent screen of one image (green) to serve as a projection surface for the other projected images. The fluorescent screens in use today are usually made of white powdered material which has been deposited on a glass viewing plate as a dense impervious screen with a matte surface and is usually provided with an aluminum reflecting backing. This forms an excellent screen on which to project focussed images as well as a fluorescent screen for translating cathode ray intensities into light values.

The tube 40 in Fig. 6 is the same kind of a three picture tube as that described in connection with Fig. 1. A red color-separation image is produced at screen 41, a green image at screen 42, and a blue image at screen 43. A mirror 44 positioned close to the red image 41 reflects light through a lens 45. A second mirror 46 again reflects the light to the screen 42 where it is focussed and viewed. Assuming that the three collor-separation pictures are the same size as produced on the screens 41, 42, and 43, the lens 45 must project an image onto the outside face of screen 42 which has unit magnification; that is, the optical distance from the screen 41 to the lens 45 must be the same as the optical distance from the lens to the screen 42. A similar arrangement for the blue pictures on screen 43 employs a mirror 47, a lens 48 and a second mirror 49. The image is viewed through the aperture between the two mirrors 46 and 49, and an additional lens 50 may be employed in this space if desired.

The lenses 45 and 48 invert the image of the screens and also reverse it. The reversing procedure puts the red and blue pictures in the proper registration since the mirror reversal counteracts the lens reversal. However, the lens inversion turns both the red and blue pictures upside down in comparison to the green and in order to produce proper registration the red and blue images must be originally produced on the fluorescent screens in an inverted manner. This can be done by using a selected vertical scanning wave, the details of which are well known in the art.

In Fig. 6 no color filters are shown since it is assumed that the fluorescent screens are selected to give the correct value of color. Such color-fluorescent screens are not necessary, however, except in the case of the green image. Red and blue color filters may be inserted in the system adjacent to the lenses 45 and 48.

Fig. 7 illustrates another optical scheme for using the tube described in Fig. 4 and projecting three color-separation images on a screen 52. The optical system for doing this comprises a total reflection mirror 53 for reflecting the light from a red fluorescent screen 54 to a semi-reflection mirror 55, thence through a projection lens 56 which focusses the rays on the screen 52. In a like manner the light from a blue fluorescent screen 57 is reflected by mirror 58, semi-reflection mirror 60, lens 56, to screen 52. In this system the red light must pass through mirror 60 to be reflected to the lens and the blue light must go through mirror 55. It should be noted that the desired light rays are reflected at a considerable angle from the normal and when the rays are to be transmitted through the mirrors the rays are almost normal to the surface. For this reason the reflection percentage need be only 15% to 20%.

The green image in Fig. 7 is first transmitted through a negative lens 61, then through both semi-reflection mirrors 55 and 60, then through lens 56 to the screen 52. The negative lens 61 is necessary to provide a virtual image distance for the green screen which is optically equivalent to the distance from the lens 56 to either screen 54 or 57 over the optical path which includes the mirrors.

The optical arrangement shown in Fig. 8 uses no lenses and produces three virtual images which may be observed by looking in the direction indicated by arrow 63. The television tube 64 is the same as the tube of Figs. 1, 3, and 6 and produces three color-separation pictures at fluorescence screens 65, 66, and 67. The path of the red image can easily be traced from screen 67 to mirrors 70 and 71, thence through semi-reflection mirrors 72 and 73 (shown in dotted lines) to the observer.

The path of the green image may be traced from screen 66 through mirror 72 to mirror 74, back to mirror 72, where it is reflected through mirror 73 to the observer.

The path of the blue image may be traced from screen 65 to mirror 76, thence to mirror 72, then through semi-reflecting mirror 73 to mirror 77. From mirror 77 the rays are reflected back to semi-reflecting mirror 73 which reflects the rays to the observation position at 63. The reason for the disclosed arrangement of mirrors and paths is to arrive at an optical system wherein the optical distances from all three screens to the observer are equal and wherein the images will be produced in proper alignment.

In the foregoing description of the tubes and optical systems each tube combination has been described as a separate system. It will be obvious to those skilled in the art that various other combinations may be made without departing from the spirit of the invention. For example, the tube shown in Fig. 4 may be used with a magnetic deflection field similar to the devices shown in Figs. 1 and 3. Also, the tubes shown in Figs. 1 and 3 may be used with voltage deflecting plates which resemble the sidewardly extending plates 35A and 35B.

While the description has been given in connection with three color television systems, it will be obvious that the device could be extended to a four color system. Also the tube and its optical systems can readily be adapted for use in circuit analysis to show three oscillograms at once. While there have been described and illustrated specific embodiments of the invention, it will be obvious that various changes and modifications may be made therein without departing from the field of the invention which should be limited only by the scope of the appended claims.

I claim:

1. A cathode ray receiving tube for showing three color-separation pictures comprising, an electron gun at one end of the tube for producing a cathode ray beam, a first fluorescent screen mounted at the other end of the tube substantially at right angles to the tube axis, a second fluorescent screen adjacent to the first and mounted substantially at right angles thereto, a third fluorescent screen also adjacent to the first and mounted substantially at right angles thereto, electrostatic deflection means for scanning the first fluorescent screen, and a combination electrostatic and electromagnetic means for scanning the second and third screens.

2. A cathode ray receiving tube for showing three color-separation pictures comprising, an electron gun at one end of the tube for producing a cathode ray beam, a first fluorescent screen mounted at the other end of the tube substantially at right angles to the tube axis, a second fluorescent screen adjacent to the first and mounted substantially at right angles thereto, a third fluorescent screen also adjacent to the first and mounted substantially at right angles thereto, electrostatic deflection means for scanning the first fluorescent screen, and magnetic coils, mounted external to the tube, for sequentially deflecting the cathode beam toward the second and third fluorescent screens while pictures on these screens are being produced.

3. A cathode ray receiving tube for showing three color-separation pictures comprising, an electron gun at one end of the tube for producing a cathode ray beam, a first fluorescent screen mounted at the other end of the tube substantially at right angles to the tube axis, a second fluorescent screen adjacent to the first and mounted substantially at right angles thereto, a third fluorescent screen also adjacent to the first and mounted substantially at right angles thereto, a first set of electrostatic deflection plates for scanning the first fluorescent screen when a color-separation picture is produced thereon, and a second set of electrostatic deflection plates for scanning the second and third fluorescent screens when color-separation pictures are produced thereon.

4. A cathode ray receiving tube for showing three color-separation pictures comprising, an electron gun at one end of the tube for producing a cathode ray beam, a first fluorescent screen mounted at the other end of the tube substantially at right angles to the tube axis, a second fluorescent screen adjacent to the first and mounted at an angle of substantially 120° thereto, a third fluorescent screen also adjacent to the first and mounted at an angle of substantially 120° thereto, a first electrostatic deflection means for scanning the first fluorescent screen, and a second electrostatic deflection means for scanning the second and third screens.

5. A cathode ray receiving tube showing three color-separation pictures comprising, an electron gun at one end of the tube for producing a cathode ray beam, a first fluorescent screen mounted at the other end of the tube substantially at right angles to the tube axis, a second fluorescent screen adjacent to the first and mounted at an angle of substantially 120° thereto, a third fluorescent screen also adjacent to the first and mounted at an angle of substantially 120° thereto, a first pair of deflection plates mounted within the tube adjacent to the tube axis for causing electrostatic deflection of the cathode ray beam when scanning the first fluorescent screen, and a second pair of deflection plates mounted within the tube for causing electrostatic deflection of the cathode ray beam to move to one side of the first set of deflection plates when scanning the second and third fluorescent screens.

SOLO S. ROTH.

REFERENCES CITED

The following references are of record in the file of this patent:

UNITED STATES PATENTS

| Number | Name | Date |
|---|---|---|
| 1,988,931 | Alexanderson | Jan. 22, 1935 |
| 2,337,980 | De Mont | Dec. 28, 1943 |
| 2,481,839 | Goldsmith | Sept. 13, 1949 |
| 2,509,038 | Goldsmith | May 23, 1950 |
| 2,552,464 | Siezen | May 8, 1951 |

FOREIGN PATENTS

| Number | Country | Date |
|---|---|---|
| 562,334 | Great Britain | June 28, 1944 |